(12) United States Patent
Hill et al.

(10) Patent No.: US 10,770,190 B2
(45) Date of Patent: Sep. 8, 2020

(54) CATALYTIC RECOMBINER AND FILTER APPARATUS

(71) Applicant: FRAMATOME GMBH, Erlangen (DE)

(72) Inventors: Axel Hill, Stockstadt (DE); Stefan Rosenberger, Moembris (DE)

(73) Assignee: Framatome GmbH, Erlangen (DE)

( * ) Notice: Subject to any disclaimer, the term of this patent is extended or adjusted under 35 U.S.C. 154(b) by 0 days.

(21) Appl. No.: 16/503,784

(22) Filed: Jul. 5, 2019

(65) Prior Publication Data

US 2019/0348185 A1 Nov. 14, 2019

Related U.S. Application Data

(63) Continuation of application No. PCT/EP2017/050486, filed on Jan. 11, 2017.

(51) Int. Cl.
| | |
|---|---|
| *G21C 9/06* | (2006.01) |
| *G21C 13/02* | (2006.01) |
| *G21F 9/02* | (2006.01) |
| *B01D 53/04* | (2006.01) |

(52) U.S. Cl.
CPC ............ *G21C 9/06* (2013.01); *B01D 53/0407* (2013.01); *G21C 13/022* (2013.01); *G21F 9/02* (2013.01); *B01D 2253/108* (2013.01); *B01D 2253/204* (2013.01); *B01D 2257/202* (2013.01);
(Continued)

(58) Field of Classification Search
CPC ........ G21C 9/004; G21C 9/06; G21C 13/022; G21F 9/02; B01D 2257/108; B01D 2257/2068
See application file for complete search history.

(56) References Cited

U.S. PATENT DOCUMENTS

| | | | | |
|---|---|---|---|---|
| 3,018,159 | A | * | 1/1962 | Silverman ................. C01B 7/14 423/241 |
| 4,369,048 | A | * | 1/1983 | Pence ................. B01D 53/0473 376/314 |

(Continued)

FOREIGN PATENT DOCUMENTS

| | | |
|---|---|---|
| CN | 102744062 B2 | 11/2014 |
| EP | 3023992 A1 | 5/2016 |

(Continued)

*Primary Examiner* — Sharon M Davis
(74) *Attorney, Agent, or Firm* — Laurence A. Greenberg; Werner H. Stemer; Ralph E. Locher

(57) ABSTRACT

A catalytic recombiner and filter apparatus is especially suited for placement in a containment of a nuclear reactor. The apparatus has a natural convection flow duct with a number of catalytic elements for recombining hydrogen and oxygen contained in a gas flow through the flow duct. The catalytic recombiner and filter apparatus provides for reliable hydrogen reduction and iodine filtering for a gas flow even for a comparatively long period of operation. The catalytic recombiner and filter apparatus includes a number of adsorber elements with iodine adsorbing surfaces and with macroscopic flow channels in between. The iodine adsorbing surfaces are flown over by the gas flow, and the adsorber elements are arranged, when in use, downstream of the catalytic elements in a direction of the gas flow.

13 Claims, 4 Drawing Sheets

(52) U.S. Cl.
CPC ............ *B01D 2257/2068* (2013.01); *B01D 2259/4583* (2013.01)

(56) References Cited

U.S. PATENT DOCUMENTS

| | | | | |
|---|---|---|---|---|
| 6,942,846 B1 * | 9/2005 | Eckardt | .................... | G21C 9/06 423/437.2 |
| 2016/0019987 A1 * | 1/2016 | Eckardt | .................. | B01D 47/10 376/283 |
| 2017/0206986 A1 * | 7/2017 | Cooper | .................. | G21C 9/004 |

FOREIGN PATENT DOCUMENTS

| | | |
|---|---|---|
| JP | H1194992 A | 4/1999 |
| JP | 2004157022 A | 6/2004 |
| JP | 2012127716 A | 7/2012 |

\* cited by examiner

CATALYTIC RECOMBINER AND FILTER APPARATUS

CROSS-REFERENCE TO RELATED APPLICATION

This application is a continuation, under 35 U.S.C. § 120, of copending international application No. PCT/EP2017/050486, filed Jan. 11, 2017, which designated the United States; the prior application is herewith incorporated by reference in its entirety.

BACKGROUND OF THE INVENTION

Field of the Invention

The invention relates to a catalytic recombiner and filter apparatus, preferably for placement in a containment of a nuclear reactor.

Japanese published patent application JP H 1194992 A discloses a catalytic recombiner and filter apparatus for placement in a containment of a nuclear reactor, comprising a natural convection flow duct, inside which a number of catalytic elements for recombining hydrogen and oxygen contained in a gas flow through the flow duct are arranged. Upstream of the catalytic elements there is an iodine filter flown through by the gas flow. Further upstream of the iodine filter there may be a particle filter and a moisture separator to prevent clogging of the iodine filter. The main purpose of this arrangement is the protection of the catalyst. The underlying objective in this case is not to reduce the radioactive source term inside the containment atmosphere.

Such a device has a relatively high pressure drop and therefore an intrinsic tendency to restrict or to prevent the convection flow. This tendency is even stronger if, despite the presence of a particle filter and a moisture separator, the iodine filter becomes partially or even fully blocked during operation by agglomerating particles and liquid droplets contained in the gas flow.

BRIEF SUMMARY OF THE INVENTION

It is therefore an object of the present invention to provide a catalytic recombiner and filter apparatus which avoids the above mentioned problems and which provides reliable hydrogen reduction and iodine filtering for a gas flow even for a comparatively long period of operation inside a containment of a nuclear facility. The main general objective here is to reduce the radioactive source term inside the containment atmosphere.

With the above and other objects in view there is provided, in accordance with the invention, a catalytic recombiner and filter apparatus, preferably for placement in a containment of a nuclear reactor. The catalytic recombiner and filter apparatus comprises:

a natural convection flow duct;
a number, preferably a plurality, of catalytic elements disposed in said flow duct for recombining hydrogen and oxygen, or carbon monoxide and oxygen, contained in a gas flow through said flow duct;
a number, preferably a plurality, of adsorber elements having iodine adsorbing surfaces and macroscopic flow channels formed in between said iodine adsorbing surfaces, wherein said iodine adsorbing surfaces are flown over by the gas flow;
said adsorber elements being arranged, when in use, downstream of the catalytic elements in a direction of the gas flow.

In other words, the present invention provides for a catalytic recombiner and filter apparatus, preferably for placement in a containment of a nuclear reactor, comprising a natural convection flow duct, inside which a number of catalytic elements for recombining hydrogen and oxygen, or alternatively carbon monoxide and oxygen, contained in a gas flow through the flow duct are arranged, wherein there are a number of adsorber elements with iodine adsorbing surfaces and with macroscopic flown channels in between them, and wherein the iodine adsorbing surfaces are flown over by the gas flow.

The inventors have found that the iodine filters employed in the prior art, having microscopic pores and being flown through by the gas stream, yield a relatively high filtering efficiency but also a high pressure drop and low flow rates. In contrast with the prior art, the claimed invention provides for adsorber elements with reactive surface areas and with macroscopic flow channels in between them. Hence, the reactive surface areas are flown over, or flown by (as opposed to flown through) by the gas flow, yielding a relatively low filtering efficiency but also a low pressure drop and large flow rates. In the long run, over the course of, for example, 5 to 20 h with a certain gas portion inside the containment passing by multiple times, these elements will be more effective than the prior art solutions. In contrast to that, the flow-over time of the gas flow, i.e. the duration of dwell at the adsorber elements is typically in a range of 0.03 to 2.0 s.

In a particularly advantageous embodiment an arrangement of the iodine adsorbing elements downstream of the catalytic elements will allow for overheating of the gas stream before passing the adsorbing elements, which is important for avoiding damages to zeolite based or similar adsorbents. In this case there is no need for a separate moisture separator. Besides that, the higher temperature of the gas stream at the adsorber elements yields better adsorption.

In summary, the present invention provides, among others, the following advantages:

Startup without delay, even at low hydrogen concentrations, and continuous operation afterwards.
Enduring and effective support of natural convention/air circulation inside the containment.
Effective pressure reduction and retention of radioactive ingredients inside the containment.
A corresponding filtered containment venting system (FCVS) can be realized in a simpler and cost-efficient manner with smaller components.
Retro-fitting into existing plants is possible.

These and other advantages related to the invention, as well as structural and functional details, will become more apparent in the subsequent detailed description.

Other features which are considered as characteristic for the invention are set forth in the appended claims.

Although the invention is illustrated and described herein as embodied in a catalytic recombiner and filter apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

Likewise technical elements are designated the same reference numerals throughout the drawing figures.

DETAILED DESCRIPTION OF THE INVENTION

Figure 1:
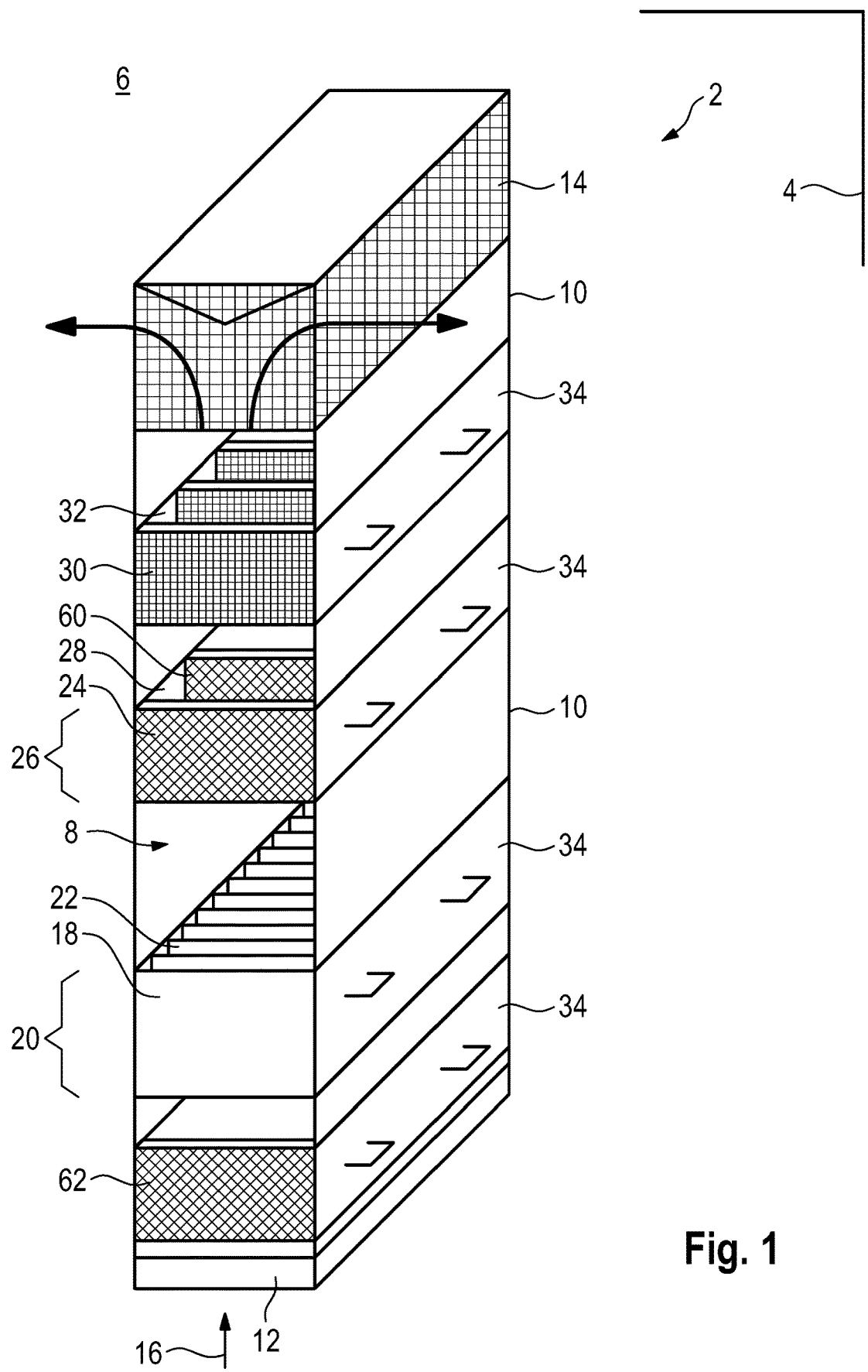
FIG. 1 is a schematic perspective overview of a first exemplary embodiment of a catalytic recombiner and filter apparatus according to the invention.

Referring now to the figures of the drawing in detail and first, particularly, to FIG. 1 thereof, there is shown a partially cut perspective view of a catalytic recombiner and filter apparatus 2, preferably for placement in a containment 4 of a nuclear reactor 6 (only schematically indicated here) or in another place of a nuclear reactor or nuclear facility. The catalytic recombiner and filter apparatus 2 comprises a flow duct 8 confined by a housing 10. The flow duct 8 is aligned substantially vertically. It has an inlet 12 at the bottom and an outlet 14 at the top. The arrangement is such that a gas flow or gas stream through the flow duct 8 has a flow direction substantially along the vertical direction, as indicated by arrow 16.

A nuclear power plant 6 usually comprises a safety enclosure called containment 4. The containment wall encloses nuclear components and is hermetically sealed against the outer environment. In particular during severe accidents, the containment atmosphere inside a containment 4 of a nuclear power plant and hence the gas flow through the flow duct 8 may contain hydrogen and/or carbon monoxide which in combination with oxygen might form a flammable mixture, as well as airborne radioactivity comprising, among others aerosols, elemental iodine ($I_2$) and iodine compounds. These ingredients shall be removed from the gas flow and hence from the containment atmosphere by way of the catalytic recombiner and filter apparatus 2.

In a lower part of the flow duct 8 there are a number, preferably a plurality of catalytic elements 18 arranged within a catalytic zone 20 inside the flow duct 8 for the flameless recombination of hydrogen and oxygen contained in a gas flow through the flow duct 8 to yield water (vapor), or alternatively for recombining carbon monoxide and oxygen to yield carbon dioxide. Such a device is also known as a passive autocatalytic recombiner (PAR). The catalytic elements 18 may for example comprise several sheets, plates, blades or other objects made of or comprising catalytically active materials or surfaces. The sheets, plates or blades are preferably arranged in parallel to each other and have vertically aligned flow channels 22 between them. The flow channels 22 are arranged so as to have only a small impact on the gas flow through the flow duct 8 with respect to pressure drop and velocity drop.

If the atmosphere surrounding the catalytic elements 18 contains hydrogen (or alternatively carbon monoxide) and oxygen, flameless recombination of these two gaseous components is initiated by the catalytic elements 18. Due to the exothermic nature of the catalytic process the catalytic elements 18 and the gas inside the flow duct 8 are heated, leading to a natural convection flow through the flow duct 8 (i.e., so-called chimney effect). In general this leads to a revolving movement of the containment atmosphere, wherein some portions and eventually the whole enclosed volume pass through the flow duct 8 several times, in a cyclic manner. The natural convection flow is maintained as long as the atmosphere around the inlet 12 of the catalytic recombiner and filter apparatus 2 contains sufficient amounts of hydrogen and oxygen for the recombination to happen.

In general, the atmosphere entering the flow duct 8 at the inlet 12 contains water vapor or steam. Besides that, steam is released by the catalytic reaction itself. By a suitable design of the catalytic elements 18 and the flow channels 22 in between them relatively high temperatures and therefore overheating of the steam portion leaving the catalytic zone 20 can be achieved.

Preferably downstream of (i.e., above) the catalytic elements 18 there are a number, preferably a plurality, of iodine adsorber elements 24 arranged within the flow duct 8, altogether forming an iodine filtering zone 26. Each of the adsorber elements 24 comprises a number of iodine adsorbing surfaces 60 which are flown over by the gas flow. Similar to the catalytic elements 18, the adsorber elements 24 may for example comprise several sheets, plates, blades or other objects made of or comprising (ad-) sorbent materials or surfaces, wherein the sheets, plates or blades are preferably arranged in parallel to each other and having vertically aligned flow channels 28 in between them. In an alternative embodiment, the flow channels 28 may have a different geometry. However, the general design goal in either case is that the flow channels 28 are arranged such as to have only a small impact on the gas flow through the flow duct 8 with respect to pressure drop and velocity drop.

Therefore, the flow channels 28 between the adsorber elements 24 have a macroscopic size, each of them preferably comprising a flow cross section in the range of 500 up to 5000 mm$^2$. Hence, the iodine adsorbing surfaces 60 of the adsorber elements 24 are flown over by the gas flow in the flow duct 8. They are flown by, not flown through, like microscopic pores in a conventional filter.

Primarily, at the adsorbing surfaces 60 of the adsorber elements 24 elemental iodine ($I_2$) or organic iodine compounds like methyl iodide ($CH_3I$) contained in the gas flow are removed/deposited by way of physical and/or chemical adsorption. Suitable adsorbents for this task may be based, for example, on silver zeolite (AgX) and/or silver nitrate ($AgNO_3$) or MOF based materials. MOFs (metal-organic frameworks) are compounds consisting of metal ions or clusters coordinated to organic ligands to form one-, two-, or three-dimensional structures. They are a subclass of coordination polymers, with the special feature that they are often porous. The adsorbents are preferably arranged on suitable supporting materials or substrates, manufactured for example by suitable methods of surface treatment known to a person skilled in the art.

In the embodiment described above, the catalytic elements 18 serve multiple purposes:

They act as a completely passive "pump" for the gas flow through the flow duct 8, initiating and maintaining natural convection.

They remove flammable hydrogen concentrations from the containment atmosphere.

They heat the gas flow such that reactivity and therefore efficiency of the adsorption process in the filtering zone 26 further downstream are increased.

They ensure overheating of steam components within the gas flow, thereby preventing or excluding condensation in the filtering zone 26 and keeping the adsorber elements 24 free from humidity or moisture.

For effective overheating the temperature of the gas flow leaving the catalytic zone 20 is preferably set by way of system design to values >40° C. up to 600° C. above the saturated vapor temperature. This means that the adsorber elements 24 have to be particularly temperature resistant in order to cope with the high temperatures of the gas flow. A suitable adsorber material is, for example, silver zeolite.

Figure 4:
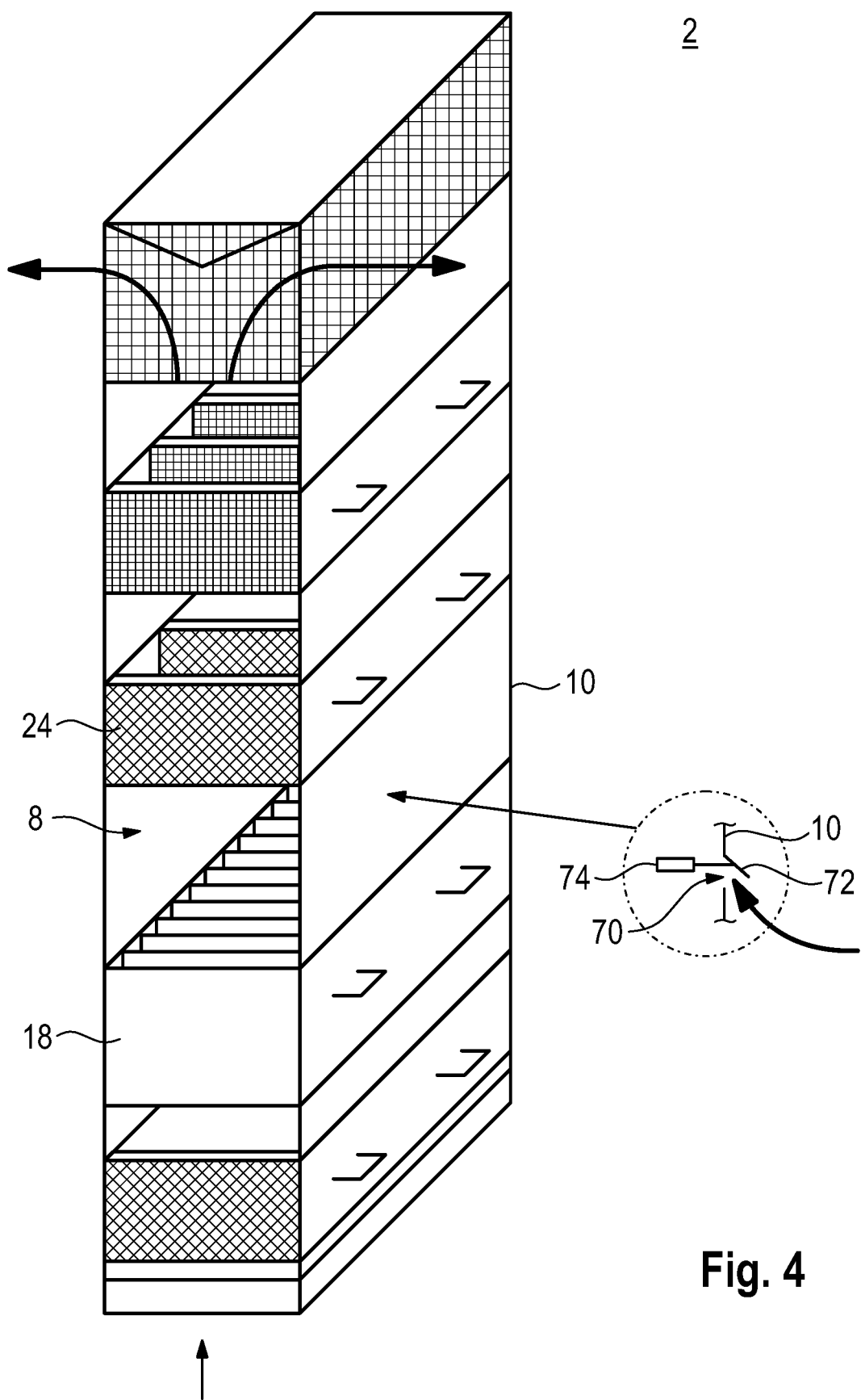
FIG. 4 is a similar view of an enhancement of the embodiment shown in FIG. 3.

In order to avoid temperatures >600° C. (in some case even >500° C.) and therefor to avoid damages to the adsorber elements 24, there may be ventilation slots 70 in the housing 10 of the flow duct 8 in the section upstream of the adsorber elements 24 and downstream of the catalytic elements 18, as shown schematically in FIG. 4. Preferably, the ventilation slots 70 are covered with passively actuated cover elements 72, in particular pivotable or slidable flaps, such that the ventilation slots 70 are closed at lower temperatures (e.g. <600° C.) prevailing inside the flow duct 8 and are opened at higher temperatures (e.g. >600° C.). Hence, at lower temperatures the ventilation slots 70 are closed, but at higher temperatures cool ambient air is sucked from the outside into the flow duct 8 through the ventilation slots 70, thereby mixing with the hot gas stream inside the flow duct 8 and cooling it below the critical temperature. The passive actuation of the cover elements 72 can be realized, for example, by a bi-metal actuator or a shape-memory material actuator or by an actuator based on the temperature-dependent expansion of a fluid inside a container, for example a piston. The switching temperature of such an actuator 74 or trigger is preferably adapted to the permissible maximum operating temperature of the adsorber elements 24 inside the flow duct 8.

In a non-illustrated, alternative embodiment with less demands for the temperature resistance of the adsorber elements 24, the filtering zone 26 with the adsorber elements 24 can be arranged upstream of the catalytic zone 20 with the catalytic elements 18. Alternatively, the catalytic elements 18 and the adsorber elements 24 can be mixed within one and the same zone or section. There may even be a two-stage catalytic recombiner with a first catalytic zone and a second catalytic zone further downstream, wherein the iodine filtering zone with the adsorber elements is arranged in between the first catalytic zone and the second catalytic zone. In either case the flow channels between any of these elements are preferably designed for low pressure drop, with the gas stream flowing over the catalytic and/or adsorbing surfaces as described above.

Some preferred design parameters of the catalytic recombiner and filter apparatus 2 are as follows: The device is supposed to work at containment atmospheric pressures of 0.5 up to 12.0 bar (relative to the outside atmospheric pressure), at containment atmospheric temperatures in the range of 30 up to 250° C., and with hydrogen (or carbon monoxide) concentrations in the range of 1 up to 15 vol.-%. The design is preferably such that the flow velocity at the inlet of the catalytic zone 20 is in the range of 0.2 up to 2.0 m/s. The vertical length/height of the filtering zone 26 is preferably within the range of 0.08 up to 0.8 m, wherein the dwell time of the radioactive particles at the sorbent material is preferably within the range of 0.03 up to 2.0 s.

In the embodiment shown in FIG. 1 there is second group of adsorber elements 30 mounted inside the flow duct 8 downstream of the iodine adsorber elements 30 of the iodine filtering zone 26. The adsorber elements 30 of the second group are primarily configured for retention of noble gases contained in the gas flow and therefore also called noble gas adsorber elements. Like the iodine adsorber elements 24 they can be realized as molecular sieves. In an alternative embodiment the adsorber elements 30 for noble gas retention can be positioned upstream of the adsorber elements 24 for iodine retention, but preferably still downstream of the catalytic elements 18 of the catalytic recombiner. There are flow channels 32 between the adsorber elements 30, the geometry and dimension of which resembles the geometry and dimension of the flow channels 28 between the adsorber elements.

After the inlet 12 and before the catalytic elements 18 there may be an entry-side moisture separator 62.

The entirety of the catalytic elements 18 or a subset of them is preferably mounted in a drawer-like support frame or drawer 34 which can be slid into and removed from, if necessary, the housing 10 of the flow duct 8. The same is true for the iodine adsorber elements 24 and, if present, the noble gas adsorber elements 30 and other filter or recombiner units.

Figure 2:
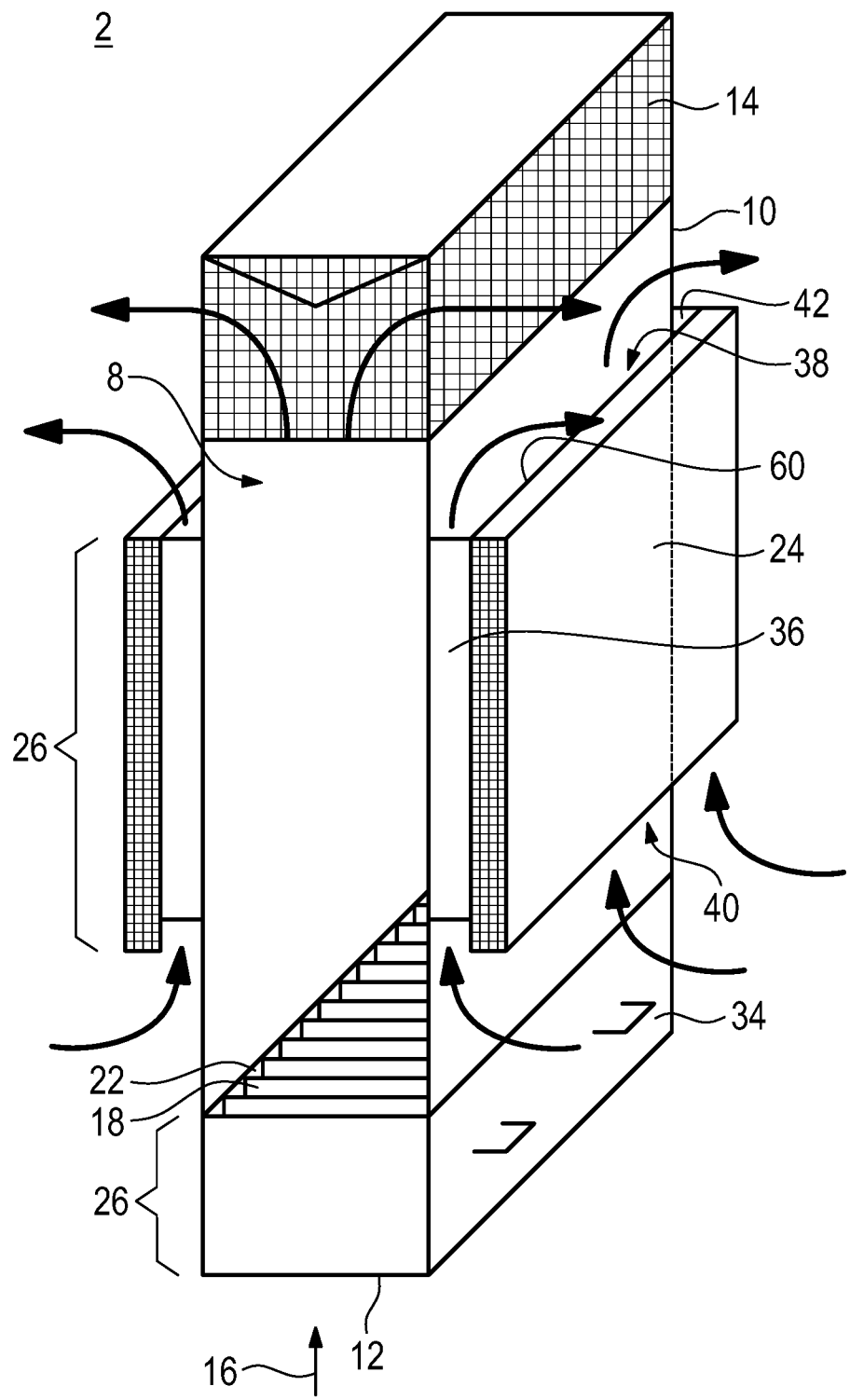
FIG. 2 is a similar view of a second variant thereof.

In another embodiment shown in FIG. 2 there are no iodine adsorber elements 24 within the flow duct 8. Instead, plate-shaped adsorber elements 24 are fixed on the outside of the housing 10 with the help of support elements 36, preferably at the side-edges, the adsorber elements 24 being in parallel alignment to the exterior face of the housing 10. Preferably, the adsorber elements 24 are mounted somewhat above the catalytic zone 20 which is realized by a number of catalytic elements 18 inside the housing 10. Each adsorber element 24 comprises an iodine adsorbing surface 60 facing inwards to the exterior face of the housing 10. There is a gap in between the adsorber element 24 and the housing 10, hence realizing a secondary flow duct 38 with an inlet 40 at the bottom and an outlet 42 at the top. During operation ambient air is sucked into the (main) flow duct 8 via inlet 12 by virtue of the chimney effect as explained above. Some of the convection gas flow is diverted and passes through the secondary flow duct 38 via inlet 40, thereby transferring and binding iodine and iodine compounds to the adsorbent materials of the adsorber elements 24.

All in all, the underlying objective of the catalytic recombiner and filter apparatus 2 is not to achieve the highest possible iodine filtering rate for a one-time passing gas flow, but rather to have a reasonable balance of iodine filtering and relatively low pressure drop in order to keep alive the natural convection as long as possible. Thus, in the long run, with the (closed) containment atmosphere passing through the catalytic recombiner and filter apparatus 2 multiple times, a very high total filtering amount can be achieved. In principle, the filtering operation is only limited by the capacity of the (ad-) sorbent materials of the adsorber plates 24 and by the availability of hydrogen and oxygen in the containment atmosphere as the driving "fuel."

Figure 3:
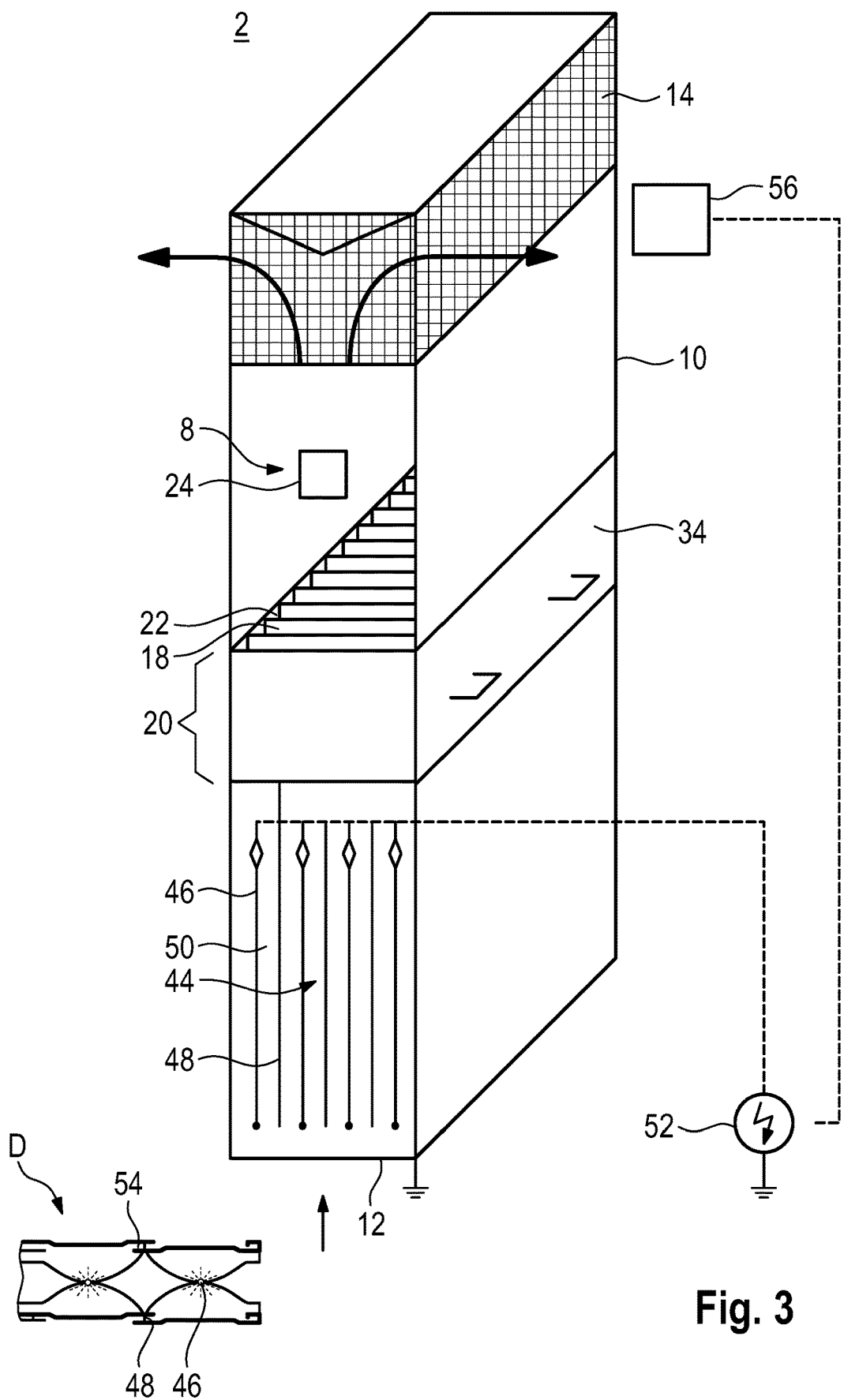
FIG. 3 is a similar view of a third variant thereof.

In a preferred embodiment there is an electrostatic aerosol filter 44 arranged inside the flow duct 8, preferably upstream of the catalytic elements 18. This is shown schematically in FIG. 3. For simplicity the adsorber elements 24 of FIGS. 1 and 2 are not shown here, but only indicated schematically. The additional features shown in FIG. 3 can be combined with either the embodiment of FIG. 1 or FIG. 2.

The electrostatic aerosol separator 44 comprises a number of wire-like discharge electrodes 46 and a number of wire-like collecting electrodes 48, electrically isolated from each other by isolators and preferably aligned vertically and in parallel to each other inside the flow duct 8. Discharge electrodes 46 and collecting electrodes 48 are spatially separated by flow channels 50 for the gas flow in between them.

During operation the discharge electrodes 46 are negatively charged and emit electrons which travel through the gas flow towards the positively charged collecting electrodes 48 where they are collected and re-injected into the corresponding electric circuit. A high voltage source 52/generator provides the required operating voltage.

During operation, aerosol particles contained in the gas flow are negatively charged by agglomeration/trapping of emitted electrons or by agglomeration with negatively charged ions trapping these electrons, and then are transported to the collecting electrode 48 where they gather and agglomerate at the surface. So-called trapping pockets 54 or traps at the collecting electrodes 48, as shown in the enlarged detail D, prevent re-entrainment of the collected aerosol particles into the gas flow. Once that the agglomerated aerosol compounds have reached a certain size and hence weight they fall down to the ground by gravitation, opposite to the flow direction of the gas flow, when they are released from the collecting electrode 48. This release may be supported by the collection electrode 48 having a flat, repelling surface or a coating with so-called lotus-effect, and by vibration. A temporary charge reversal at the collecting electrode 48 may also support shaking off the agglomerates which then drop down to the ground where they may be gathered by a suitable container (not shown here).

In a preferred embodiment the electrostatic aerosol filter 44 is powered by a thermoelectric generator 56 which is preferably thermally coupled to the catalytic elements 18 and/or to the hot gas flow as a heat source. In this way the waste heat produced by the catalytic elements 18 is converted into effective electrical energy and used to power an electrical appliance like the electrostatic aerosol filter 44.

The following is a summary list of reference numerals and the corresponding structure used in the above description of the invention:

2 catalytic recombiner and filter apparatus
4 containment
6 nuclear reactor
8 flow duct
10 housing
12 inlet
14 outlet
16 flow direction
18 catalytic element
20 catalytic zone
22 flow channel
24 adsorber element
26 filtering zone
28 flow channel
30 adsorber element
32 flow channel
34 drawer
36 support element
38 flow duct
40 inlet
42 outlet
44 electrostatic aerosol filter
46 discharge electrode
48 collecting electrode
50 flow channel
52 high voltage source
54 trapping pocket
56 thermoelectric generator
60 iodine adsorbing surface
62 moisture separator

The invention claimed is:

1. A catalytic recombiner and filter apparatus, comprising:
a duct;
a number of catalytic elements disposed in said duct for recombining hydrogen and oxygen, or carbon monoxide and oxygen, contained in a gas flow through said duct;
a number of adsorber elements arranged inside said duct, said adsorber elements having iodine adsorbing surfaces and macroscopic flow channels formed in between said iodine adsorbing surfaces, wherein said iodine adsorbing surfaces are flown over by the gas flow;
said adsorber elements being arranged downstream of the catalytic elements in a direction of the gas flow;
a housing enclosing said duct, said housing having a section between said adsorber elements and said catalytic elements with a number of ventilation slots for facilitating an influx of ambient air into said duct; and
a movable cover element disposed for covering a respective said ventilation slot and coupled to a temperature-dependent passive actuator, configured for opening said ventilation slot above a pre-defined critical temperature prevailing in said duct.

2. The catalytic recombiner and filter apparatus according to claim 1 configured for placement in a containment of a nuclear reactor.

3. The catalytic recombiner and filter apparatus according to claim 1, wherein said number of catalytic elements is a plurality of catalytic elements and said number of adsorber elements is a plurality of adsorber elements.

4. The catalytic recombiner and filter apparatus according to claim 1, wherein said flow channels are aligned along a longitudinal direction of said duct, and each of said flow channels has a cross section with an area of at least 500 $mm^2$.

5. The catalytic recombiner and filter apparatus according to claim 1, wherein each of said flow channels has a cross section with an area of at least 1500 $mm^2$.

6. The catalytic recombiner and filter apparatus according to claim 1, wherein said actuator has a given switching temperature corresponds to a permissible maximum operating temperature of said adsorber elements.

7. The catalytic recombiner and filter apparatus according to claim 1, wherein said iodine adsorbing surfaces are made of, or contain, one or more materials selected from the group consisting of silver zeolite, silver-coated metal, and metal organic framework based materials.

8. The catalytic recombiner and filter apparatus according to claim 7, wherein said silver-coated metal is in the form of silver-coated copper wires.

9. A nuclear power plant, comprising a containment and a catalytic recombiner and filter apparatus according to claim 1 disposed inside said containment.

10. A catalytic recombiner and filter apparatus, comprising:
a duct;
an electrostatic aerosol filter arranged inside said duct;
a number of catalytic elements disposed in said duct for recombining hydrogen and oxygen, or carbon monoxide and oxygen, contained in a gas flow through said duct;
a number of adsorber elements having iodine adsorbing surfaces and macroscopic flow channels formed in between said iodine adsorbing surfaces, wherein said iodine adsorbing surfaces are flown over by the gas flow;

said adsorber elements being arranged downstream of the catalytic elements in a direction of the gas flow.

11. The catalytic recombiner and filter apparatus according to claim 10, wherein said electrostatic aerosol filter is arranged upstream of said catalytic elements in the direction of the gas flow.

12. The catalytic recombiner and filter apparatus according to claim 10, further comprising a thermoelectric generator for powering said electrostatic aerosol filter.

13. The catalytic recombiner and filter apparatus according to claim 12, wherein the thermoelectric generator is thermally coupled to said catalytic elements and/or to the gas flow.

* * * * *